US008904651B2

(12) United States Patent
Heinzelmann

(10) Patent No.: US 8,904,651 B2
(45) Date of Patent: Dec. 9, 2014

(54) HANDHELD WORK APPARATUS

(75) Inventor: Georg Heinzelmann, Backnang (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 337 days.

(21) Appl. No.: 13/198,272

(22) Filed: Aug. 4, 2011

(65) Prior Publication Data

US 2012/0030954 A1 Feb. 9, 2012

(30) Foreign Application Priority Data

Aug. 5, 2010 (DE) ......................... 10 2010 033 489

(51) Int. Cl.

| | |
|---|---|
| ***B23D 57/02*** | (2006.01) |
| ***B27B 17/00*** | (2006.01) |
| ***F01M 1/02*** | (2006.01) |
| ***F01M 11/02*** | (2006.01) |
| ***F01M 9/10*** | (2006.01) |
| ***B27B 17/12*** | (2006.01) |

(52) U.S. Cl.

CPC ...................................... *B27B 17/12* (2013.01)
USPC ......................................... 30/381; 123/196 R

(58) Field of Classification Search

USPC ....... 30/381–387; 123/196 R, 198 C; 188/67, 188/69, 28

See application file for complete search history.

(56) References Cited

U.S. PATENT DOCUMENTS

| | | | | |
|---|---|---|---|---|
| 2,172,824 | A * | 9/1939 | White | 242/265 |
| 3,343,927 | A * | 9/1967 | Brede, III et al. | 188/218 A |
| 3,465,603 | A * | 9/1969 | Lindstrom | 74/89.14 |
| 3,892,285 | A * | 7/1975 | Bruni | 180/346 |
| 4,353,163 | A | 10/1982 | Overbury et al. | |
| 4,662,071 | A * | 5/1987 | Hoppner et al. | 30/381 |
| 4,893,407 | A * | 1/1990 | Lane | 30/123.4 |
| 5,107,884 | A * | 4/1992 | Orlandi | 137/454.5 |
| 5,184,403 | A * | 2/1993 | Schliemann | 30/123.4 |
| 5,214,864 | A * | 6/1993 | Tasaki et al. | 30/123.4 |
| 5,243,764 | A * | 9/1993 | Wieland | 30/383 |
| 5,709,032 | A * | 1/1998 | Mizutani et al. | 30/382 |
| 5,855,067 | A | 1/1999 | Taomo et al. | |
| 7,182,059 | B2 * | 2/2007 | Kawamura et al. | 123/196 R |
| 2008/0128228 | A1 * | 6/2008 | Jesse et al. | 188/205 R |

FOREIGN PATENT DOCUMENTS

WO WO 2011/098097 A1 8/2011

* cited by examiner

*Primary Examiner* — Ghassem Alie
*Assistant Examiner* — Bharat C Patel
(74) *Attorney, Agent, or Firm* — Walter Ottesen P.A.

(57) ABSTRACT

A portable handheld work apparatus includes a drive motor (26) which drives a work tool via a drive shaft (25). The work apparatus further includes a brake drum (8), which is connected to the drive shaft so as to rotate therewith, and an oil pump (15) which is driven by the drive shaft (25) via a drive worm gear (20). A simple configuration and a long service life are obtained when the drive worm gear (20) is formed on a pot-shaped component (31). The edge (30) of the pot-shaped component (31) is connected to the brake drum so as to rotate therewith. The pot-shaped component is self supported in the region of its base (40) on the drive shaft (25).

16 Claims, 3 Drawing Sheets

HANDHELD WORK APPARATUS

CROSS REFERENCE TO RELATED APPLICATION

This application claims priority of German patent application no. 10 2010 033 489.8, filed Aug. 5, 2010, the entire content of which is incorporated herein by reference.

BACKGROUND OF THE INVENTION

U.S. Pat. No. 7,182,059 discloses a chainsaw having an oil pump mechanism. The drive sprocket for the saw chain is arranged between a clutch drum and a worm gear which drives the oil pump. The drive sprocket and the worm gear are operatively connected to each other via a spur gearing.

SUMMARY OF THE INVENTION

It is an object of the invention to provide a handheld work apparatus of the type described above which has a simple configuration and a long service life.

The handheld work apparatus of the invention includes: a work tool; a drive shaft; a drive motor configured to drive the work tool via the drive shaft; a brake drum connected to the drive shaft so as to rotate therewith; a pot-shaped component having an edge and a base; a drive worm gear configured on the pot-shaped component; an oil pump configured to be driven by the drive shaft via the drive worm gear; the edge of the pot-shaped component being fixedly connected to the brake drum so as to rotate therewith; and, the pot-shaped component being configured to be self supported on the drive shaft in the area of the base thereof.

The precision of the positioning of the drive worm and the oil pump pinion is decisive for the service life of the worm gear toothing. The rotationally fixed connection of the pot-shaped component directly with the brake drum and the support on the drive shaft on the opposite end of the pot-shaped component leads to a very exact positioning without a need to comply with exceedingly precise manufacturing tolerances. Because of the pot-shaped configuration of the component, the outer diameter of the drive worm gear can be formed relatively large.

Advantageously, the support is formed as a centering on the drive shaft. Because only a support and no rotationally fixed connection with the drive shaft is provided in this area, the support can be simply and exactly produced so that a good centering is provided. Furthermore, manufacturing tolerances can be well compensated due to the spatial separation of the rotary entrainment and centering. Advantageously, the centering extends up into the area radially inside of the drive worm gear, so that a very exact centering results for the drive worm gear. A simple configuration results when the centering is formed on a collar which is configured cylindrically and surrounds the drive shaft. The collar is advantageously self supporting in the axial direction at the end which faces away from the brake drum against the side of a bearing of the drive shaft. Thus, good positioning in the axial direction of the drive shaft is achieved. For the fixation in the peripheral direction, it is, in particular, provided that the pot-shaped component is form-fittingly connected to the brake drum via at least one entrainer. In particular, a plurality of entrainers are distributed over the periphery. A simple configuration with few individual parts results when the entrainers are formed on the pot-shaped component. The entrainers can project into corresponding cutouts in the brake drum and thus produce a rotationally fixed connection in a simple manner. Because the support in the axial direction is achieved via the collar of the pot-shaped component, the rotary entrainment does not have to effect a fixation in the axial direction.

In order to obtain a large lever arm for the torque transmission and thus a good application of force on the fixation to the brake drum, the pot-shaped component has a conical section between the drive worm gear and the edge in that the outer diameter of the pot-shaped component increases in size in the direction toward the edge. In this way, the available space can be used effectively. The fixation of the pot-shaped component on the brake drum is thereby advantageously arranged as far outward as possible. The pot-shaped component is advantageously made of plastic. Thus, a lower overall weight of the work apparatus results. Because of the pot-shaped configuration, a sufficient positioning accuracy is achieved even with a component made of plastic.

The brake drum has a cylindrical section which has a brake band looped around it. To achieve a small construction size in the axial direction, it is, in particular, provided that the pot-shaped component at least partially projects into the cylindrical section. The brake drum is advantageously arranged approximately cup-shaped, with the rim of the brake drum overlapping the pot-shaped component in the area of the conical section. A simple configuration results when the rotationally fixed connection between the drive shaft and brake drum is achieved via at least one flattening on the drive shaft, which projects into a corresponding flattened opening in the brake drum. The flattening advantageously extends only in the area of the brake drum and the drive sprocket and not into the area of the pot-shaped component. In this way, the area of the drive shaft which is configured cylindrical can be designed long. This permits manufacture in a simplified process, for example, a centerless grinding.

The axial securing of the brake drum and the pot-shaped component is advantageously effected via a circlip. Thus, no clamping of the components on the drive shaft is required, thereby resulting in a further simplification of the configuration. The circlip is, in particular, arranged on the side of the brake drum which faces away from the pot-shaped component.

Advantageously, the tool is driven by a drive sprocket which is integral with the brake drum and is arranged on the side of the brake drum which faces away from the pot-shaped component. Advantageously, the brake drum is a sintered part. In particular, the brake drum is manufactured together with the drive sprocket as a single component in a sintering process.

Advantageously, the work apparatus is a chainsaw and the tool is a saw chain.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
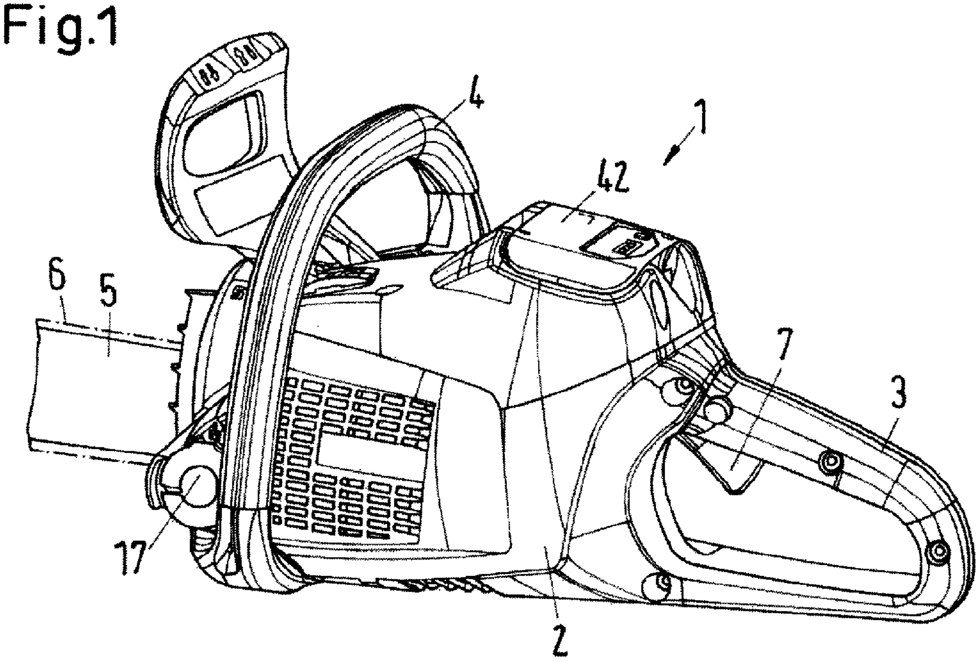
FIG. 1 is a perspective view of a motor-driven chainsaw.

FIG. 1 shows a chainsaw 1 as an example of a handheld work apparatus. The chainsaw 1 has a housing 2 into which a battery 42 is inserted from above as an energy source. A back handle 3, on which a throttle lever 7 is pivotally mounted, is arranged on the housing 2. On the end opposite the back handle 3, the chainsaw 1 also has a handle bar 4 which extends over the housing 2. A tank cap 17 which closes an oil tank foamed in the housing 2 is arranged on the housing 2 adjacent to the handle 4. On the end of the housing 2 opposite the back handle 3, a guide bar 5 projects forward. A saw chain 6, shown schematically, is configured to be driven on the periphery of the guide bar 5.

Figure 2:
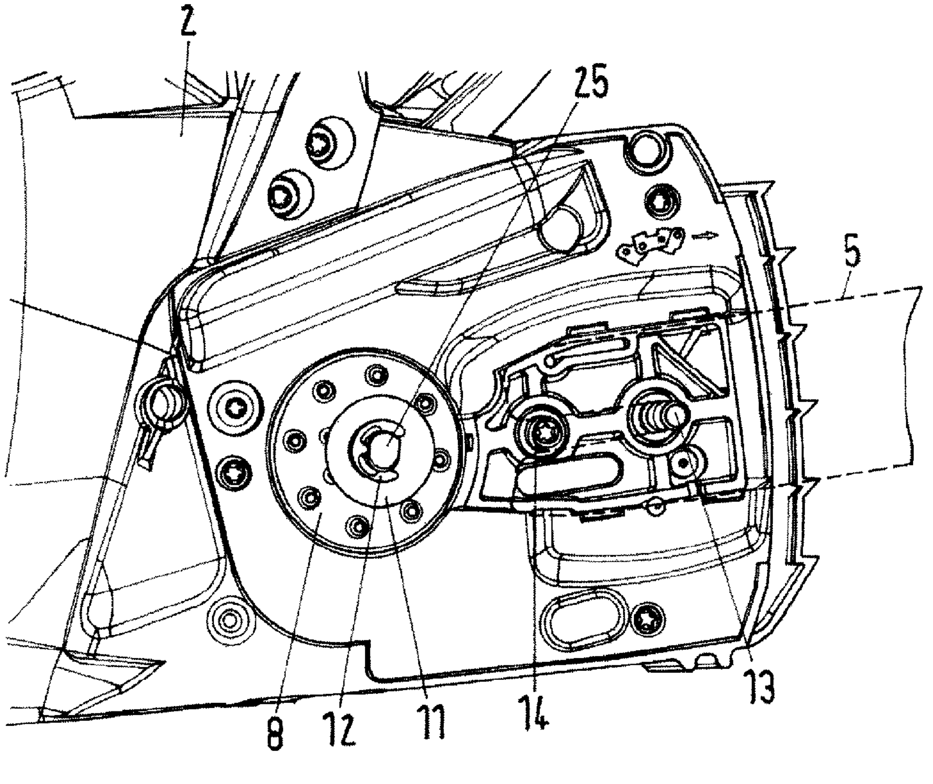
FIG. 2 is a side view of the chainsaw of FIG. 1 with the sprocket cover removed.
Figure 4:
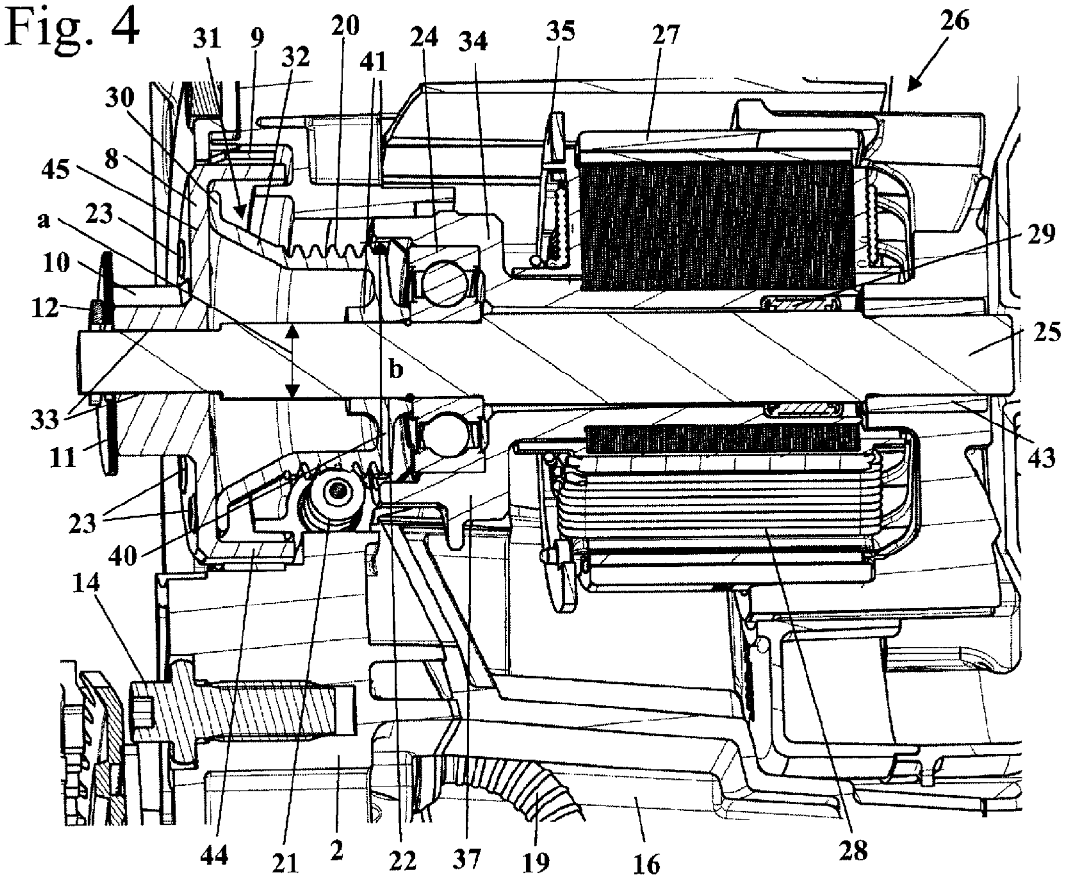
FIG. 4 is a sectional view of the chainsaw in the area of the drive shaft.

As FIG. 2 shows, a fixing pin 13 and a guide pin 14 on which the guide bar 5 is held are fixed on the housing 2. A brake drum 8 is arranged on the housing 2 adjacent to the end of the guide bar 5. A drive sprocket 10, shown in more detail in FIG. 4, is arranged on the brake drum 8. A circlip 12 is arranged on the drive shaft 25, which rotatably drives the brake drum 8, for position securing in the axial direction. A disc 11 is arranged between the circlip 12 and the drive sprocket 10.

Figure 3:
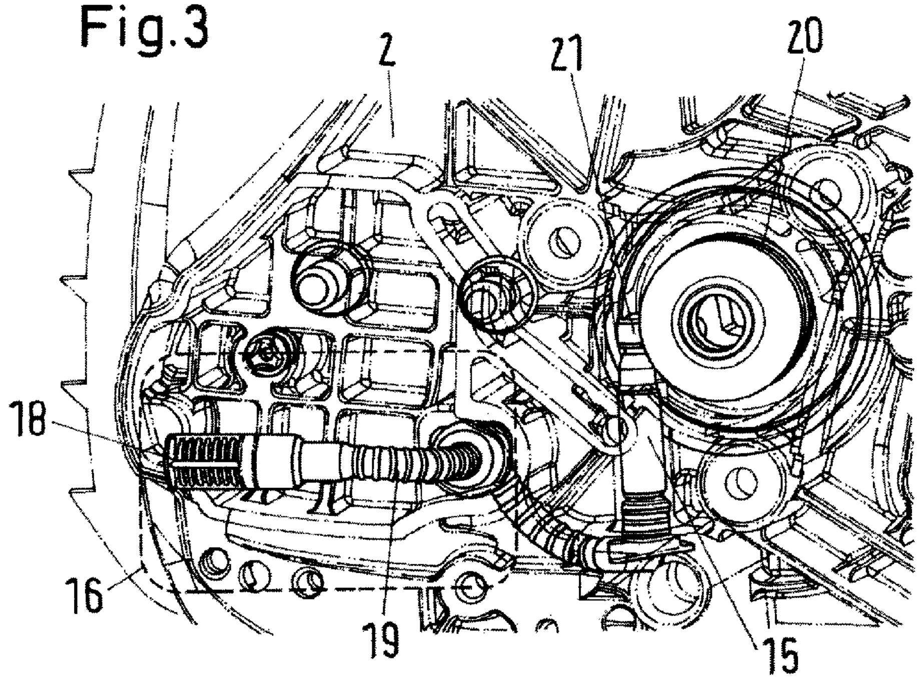
FIG. 3 is a perspective view of the oil pump of the chainsaw.

The saw chain 6 is lubricated with lubricating oil during operation. The oil tank 16, shown in FIG. 3, is provided in the housing 2 for the lubricant oil. A suction head 18, which is connected to an oil pump 15 via a line 19, is arranged in the oil tank 16. The oil pump 15 has an oil pump pinion 21 which is rotatably driven by a drive worm gear 20. The longitudinal axis of the oil pump 15 and the rotational axis of the drive worm gear 20 are arranged perpendicularly and at a distance to each other.

FIG. 4 shows the configuration of the drive of the chainsaw 1 in detail. A drive motor 26, which is configured as an electric motor and in particular as an electronically commutated external rotor motor, drives the saw chain 6. The battery 42, shown in FIG. 1, serves as the energy supply for the drive motor 26. The drive motor 26 has a rotor 27 which is rotatably fixedly connected with the drive shaft 25 at a connection 43. The connection 43 is arranged on the end of the drive shaft 25 which faces away from the drive sprocket. The drive shaft 25 is rotatably mounted in a stator 28 of the drive motor 26 via a bearing 29. The stator 28 of the drive motor 26 is connected with a motor flange 34 on which an edge region 37 is formed. A bearing 24, namely a ball bearing, with which the drive shaft is also rotatably mounted, is arranged in the edge region 37. The control circuit board 35 for the electronic commutation of the drive motor 26 is held on the stator 28.

The brake drum 8 and a pot-shaped component 31 are arranged between the bearing 24 and the drive sprocket 10. The pot-shaped component 31 is arranged on the drive shaft 25 between the brake drum 8 and the bearing 24. The pot-shaped component 31 has an edge 30 which lies on the brake drum 8. The edge 30 is rotatably fixedly connected to the brake drum 8 via entrainers 23. A conical section 32, in which the outer diameter of the pot-shaped component 31 decreases with increasing distance from the brake drum 8, extends from the edge 30. The drive worm gear 20, which is formed on the outer periphery of the pot-shaped component 31, extends from the conical section 32. The drive worm gear 20 extends up to the base 40 of the pot-shaped component 31.

The drive shaft 25 projects through the base 40. In the area directly surrounding the drive shaft 25, the pot-shaped component 31 has a collar 41 which is configured cylindrically and is aligned in parallel to the drive shaft 25. A centering 22 is formed on the inner periphery of the collar 41. The collar 41 extends from the base 40 into the interior of the pot-shaped component 31 as well as outwardly in the direction of the bearing 24. The collar 41 rests on the inner ring of the bearing 24 and supports itself in the axial direction thereon. The section of the collar 41 projecting into the interior of the pot-shaped component 31 and of the centering 22 is arranged radially inside a section of the drive worm gear 20, so that a direct centering of the drive worm gear 20 results.

As FIG. 4 also shows, the drive shaft 25 has an outer diameter (a) in the area of the pot-shaped component 31. The pot-shaped component 31 has an outer diameter (b) in the area of the drive worm gear 20. The outer diameter (b) is significantly greater than the outer diameter (a) of the drive shaft 25. The diameter (b) is at least approximately twice, advantageously at least about 2.5 times the outer diameter (a) of the drive shaft 25.

The drive sprocket 10 is integral with the brake drum 8 as a sintered component. At its outer periphery, the brake drum 8 is looped by a brake band 9 which extends over a majority of the outer periphery of the brake drum 8.

The brake drum 8 is configured approximately cup-like. The brake drum 8 has a plane base which is perpendicular to the drive shaft 25 as well as a cylindrical section 44 which extends into the interior of the housing 2 in the direction toward the drive motor 26. The brake band 9 is arranged on the cylindrical section 44. The pot-shaped component 31 projects into the receiving space formed inside the cylindrical section 44. The edge 30 of the pot-shaped component 31 rests against the base 45 of the brake drum 8 which is perpendicular to the drive shaft 25. Due to the cylindrical section 44 overlapping the pot-shaped component 31, a compact configuration results. As FIG. 4 shows, the conical section 32 is arranged largely inside the cylindrical section 44.

Figure 6:
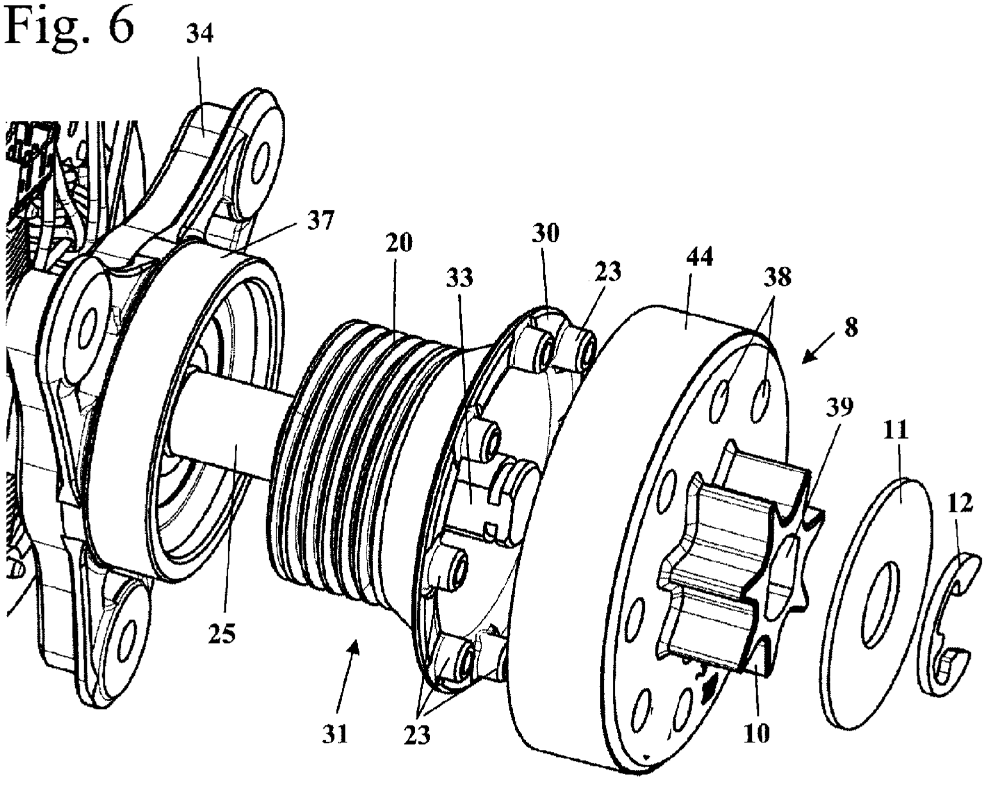
FIG. 6 is an exploded view of the drive worm gear and the brake drum.

The drive shaft 25 has two flattenings 33 in the area of the drive sprocket 10 for the rotatably fixed connection of the drive sprocket 10 and the brake drum 8 with the drive shaft 25. As the exploded view of FIG. 6 shows, the drive sprocket 10 has an opening 39 which is also configured flattened and whose shape corresponds to the shape of the drive shaft 25 in the area of the flattenings 33, so that a form-fitting, rotatably fixed connection results. The drive worm gear 20 is thus rotatably fixedly connected with the drive shaft 25 via the brake drum 8 and the drive sprocket 10. The centering of the drive worm gear 20 is achieved via the centering 22.

Figure 5:
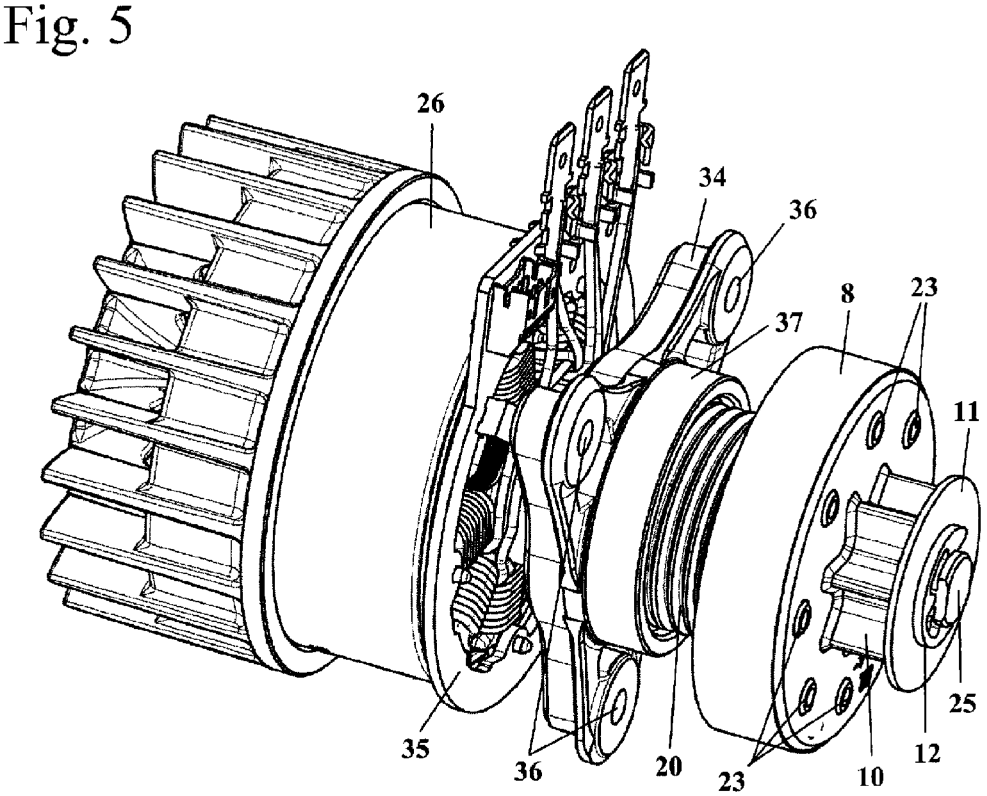
FIG. 5 is a perspective view of the drive of the chainsaw.

As FIG. 5 shows, the motor flange 34 has three fixation openings 36 for connecting and rotatably fixed mounting on the housing 2. As FIG. 5 also shows, a plurality of entrainers 23 are provided for connecting the pot-shaped component 31 with the brake drum 8.

As FIG. 6 shows, the entrainers 23 are configured pin-like and are formed on the pot-shaped component 31. The pot-shaped component is made of plastic and is manufactured together with the entrainers 23 in an injection molding process. A small number of entrainers 23 or even only one entrainer can be sufficient for the rotatably fixed mounting of the pot-shaped component 31 on the brake drum 8. The brake drum 8 has openings 38 which are positioned corresponding to the entrainers 23 and through which the entrainers 23 are pushed during assembly. As FIG. 6 also shows, the entrainers 23 and the openings 38 are arranged adjacent to the cylindrical section 44 of the brake drum 8. The radial distance of the entrainers 23 to the rotational axis of the arrangement is chosen as large as possible so that the transferable torque is as large as possible. As FIG. 4 also shows, the edge 30 has only a very small radial distance to the cylindrical section 44. The edge 30 can also project up to the cylindrical section 44.

As FIG. 4 shows, the wall thickness of the pot-shaped component 31 is essentially constant so that a comparatively large interior space of the pot-shaped component results. Thus, the result will be low weight with a high rigidity and strength.

It is understood that the foregoing description is that of the preferred embodiments of the invention and that various changes and modifications may be made thereto without departing from the spirit and scope of the invention as defined in the appended claims.

What is claimed is:

1. A handheld chainsaw comprising: a saw chain;

a drive shaft;

a drive motor configured to drive said saw chain via said drive shaft;

a brake drum connected to said drive shaft so as to rotate therewith;

a pot-shaped component having an edge, a wall section and a base;

said edge being arranged at a first end of said wall section and said base being arranged at a second end of said wall section;

a drive worm gear configured on said pot-shaped component;

said wall section and said drive shaft conjointly defining a gap therebetween;

an oil pump configured to be driven by said drive shaft via said drive worm gear;

said edge of said pot-shaped component being directly fixedly connected to said brake drum so as to rotate therewith;

said wall section and said drive shaft conjointly defining a hollow space therebetween;

said hollow space being delimited by said wall section, said base and said brake drum; and, said pot-shaped component being configured to be self supported on said drive shaft in the area of said base thereof.

2. The handheld chainsaw of claim 1, said base and said drive shaft conjointly defining an interface; and, said base having a centering at said interface for self supporting said pot-shaped component on said drive shaft.

3. The handheld chainsaw of claim 2, wherein said centering extends into the area radially inside the drive worm gear.

4. The handheld chainsaw of claim 2, wherein said base includes:

a collar configured cylindrically and surrounding said drive shaft;

said centering being formed on said collar; and, said collar extending from said base into the interior of said pot-shaped component.

5. The handheld chainsaw of claim 4, wherein:

said drive shaft has a bearing;

said collar is self supported in the axial direction on said bearing on the side of said collar which faces away from said brake drum; and, said collar extending from said base outwardly in a direction of said bearing.

6. The handheld chainsaw of claim 1, wherein said pot-shaped component and said brake drum conjointly define an interface; and, said chainsaw further comprises an entrainer at said interface configured to form fittingly connect said pot-shaped component with said brake drum in the peripheral direction.

7. The handheld chainsaw of claim 6, wherein said entrainer is formed on said pot-shaped component.

8. The handheld chainsaw of claim 1, wherein:

said pot-shaped component has a conical section between said drive worm gear and said edge;

said pot-shaped component has an outer diameter which increases in size in the direction of said edge; and, said wall section includes said conical section and said drive worm gear.

9. The handheld chainsaw of claim 1, wherein said pot-shaped component is made of plastic.

10. The handheld chainsaw of claim 1, further comprising:

a brake band; and, said brake drum having a cylindrical section about which said brake band is configured to be looped.

11. The handheld chainsaw of claim 10, wherein said pot-shaped component at least partially projects into said cylindrical section.

12. The handheld chainsaw of claim 1, wherein:

said brake drum has a flattened opening; and, said drive shaft has a flattened section configured to project into said flattened opening so as to form the rotationally fixed connection between said drive shaft and said brake drum.

13. The handheld chainsaw of claim 1, further comprising a retaining/securing ring configured to axially secure said brake drum and said pot-shaped component.

14. The handheld chainsaw of claim 1, further comprising:

a drive sprocket configured to drive said saw chain; and, said drive sprocket being configured as one piece with said brake drum and being arranged on the side of said brake drum which faces away from said pot-shaped component.

15. The handheld chainsaw of claim 1, wherein said brake drum is a sintered part.

16. The handheld chainsaw of claim 1, wherein said brake drum has a planar bottom disposed perpendicularly to said drive shaft; and, said edge of said pot-shaped component is in direct contact engagement with said planar bottom of said brake drum so as to rotate therewith.

* * * * *